United States Patent Office 3,449,357
Patented June 10, 1969

3,449,357
2-[(2,6-SUBSTITUTED)PHENOXYMETHYL]-
2-IMIDAZOLINES
Halbert C. White, Midland, Mich., assignor to The Dow Chemical Company, Midland, Mich., a corporation of Delaware
No Drawing. Filed Apr. 4, 1967, Ser. No. 628,303
Int. Cl. C07d 49/34; A61k 27/00
U.S. Cl. 260—309.6
9 Claims

ABSTRACT OF THE DISCLOSURE

The new compounds, 2-[(2,6-substituted)phenoxymethyl]-2-imidazolines, which alternately can have additional substituents in the 3 or 4 position, and their physiologically-acceptable salts such as the hydrochlorides, which are active as analgesics.

---

This invention is concerned with aryloxy-imidazolines and is particularly directed to 2-(phenoxymethyl)-2-imidazolines substituted in the 2 and 6 positions of the phenoxy group and alternately having additional substituents in the 3 or 4 positions, and the physiologically-acceptable salts thereof having the formula

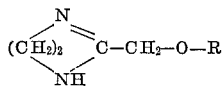
I wherein R represents a radical corresponding to one of the formulae:

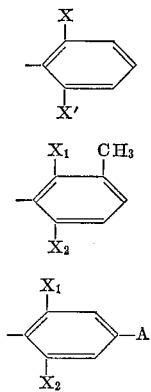

In the present specification and claims, X represents chlorine or bromine, X' represents chlorine, bromine or methyl, $X_1$ and $X_2$ each independently represent chlorine or bromine and A represents acetamido or amino.

Compounds corresponding to the above formulae will be referred to as 2-[(2,6-substituted)phenoxymethyl]-2-imidazolines. The term "physiologically-acceptable salt" herein employed refers to salts of the 2-[(2,6-substituted)phenoxymethyl]-2-imidazolines which are substantially non-toxic at dosage rates consistent with good pharmacological activity. Such physiologically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid. The 2-[(2,6-substituted)phenoxymethyl]-2-imidazolines are crystalline solids and oils which are of varying degrees of solubility in organic solvents such as 1,2-dichlorobenzene, 1,2-dimethoxyethane, methylene chloride and alcohols and only slightly soluble in water. The physiologically-acceptable salts of the 2-[(2,6-substituted)phenoxymethyl]-2-imidazolines such as 2-[(2,6-dibromophenoxy)methyl]-2-imidazoline hydrochloride are soluble in water and slightly soluble in organic solvents such as acetone, benzene and alcohols.

The novel compounds have been found to be useful for administration to laboratory animals in studying the behavior thereof and in studying drug effects on the central and peripheral nervous system. The compounds corresponding to the above Formulae I through IV wherein A is amino when R corresponds to Formula IV have been found to be particularly useful as analgesic agents. The compounds also have utility as diuretics. They have little or no significant pharmacological effects in other areas at dosages consistent with good analgesic activity. The compounds wherein R corresponds to Formula IV when A is acetamido are particularly useful as intermediates in the preparation of the compounds wherein A is amino. For such uses, the preferred form of the 2-[(2,6-substituted)phenoxymethyl]-2-imidazoline compounds is a physiologically-acceptable salt thereof, and the compounds are generally employed in the form of their hydrochloride salts. Other salts, and particularly the tosylate (p-toluenesulfonate), can also be used in the preparation and purification of the 2-[(2,6-substituted) phenoxymethyl]-2-imidazoline and can be converted to the preferred hydrochloride salts.

The compounds wherein R corresponds to Formula III are prepared by the reaction of ethylenediamine monotosylate with an ethyl 2,6-dihalo-3-methylphenoxyacetimide hydrochloride wherein "halo" refers to chlorine or bromine. The compounds wherein R corresponds to Formula IV when A is amino are prepared by the hydrolysis in acid media of a compound wherein A is acetamido. In all other cases, the compounds of the invention are prepared by the reaction of a substituted phenoxyacetonitrile corresponding to the formulae

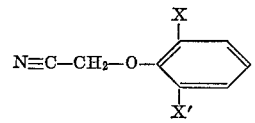
V

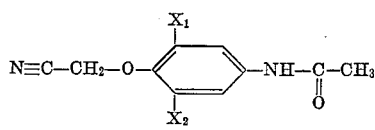
VI wherein X, X', $X_1$ and $X_2$ have the significance set out above with respect to Formulae I through IV with ethylenediamine monotosylate to form a 2-[(2,6-substituted)phenoxymethyl]-2-imidazoline tosylate, and the subsequent hydrolysis of the tosylate in aqueous base to liberate the 2-[(2,6-substituted)phenoxymethyl]-2-imidazoline in the free base form. The reaction proceeds with the evolution of ammonia when the substituted phenoxyacetonitrile and the ethylenediamine monotosylate are contacted and mixed, preferably in an inert organic solvent as a reaction medium. Representative and suitable inert organic solvents which can be employed as reaction media include xylenes, alkylbenzenes and halobenzenes, preferably 1,2-dichlorobenzene. The reaction is preferably carried out under an inert atmosphere with an inert gas being passed through the reaction mixture to carry off ammonia of reaction. The reaction proceeds readily at temperatures from about 140° to about 180° C. and the reaction is preferably carried out under reflux at the boiling temperature of the reaction mixture. In most cases, the 2-[(2,6-substituted)phenoxymethyl]-2-imidazoline product precipitates in the reaction mixture as its tosylate (p-toluenesulfonate) salt and the salt can be separated by conventional methods as filtration, centrifugation or decantation. When no precipitate forms, the salt can be separated by evaporation. The 2-[(2,6-substituted)phenoxymethyl]-2-imidazoline tosylate can be purified by conventional procedures such as recrystallization and washing. The 2-[(2,6-substituted)phenoxymethyl]-2-imidazoline tosylate can be converted to the free base form by hydrolysis in aqueous base. The free base 2-[(2,6-substituted)phenoxymethyl]-2-imidazoline is then separated by extraction with an organic solvent such as methylene chloride or chloroform followed by evaporation of the solvent. The product can be purified by conventional methods such as recrystallization, or it can be converted to a physiologically-acceptable salt.

The compounds wherein R corresponds to Formula III are prepared by substantially the same method described above with the exception that an alkyl 2,6-dihalo-3-methylphenoxyacetamide hydrochloride is employed in lieu of the substituted phenoxyacetonitrile and the use of a lower reaction temperature. In a convenient procedure, ethyl 2,6-dihalo-3-methylphenoxyacetimide hydrochloride, ethylenediamine monotosylate and an inert organic solvent are mixed together and heated at a temperature of about 75°–90° C. The product is obtained as the tosylate salt and can be separated and purified or converted to the free base as described above.

The compounds wherein R corresponds to Formula IV when A is amino are prepared by hydrolysis of a compound wherein R corresponds to Formula IV when A is acetamido in excess aqueous acid media. The hydrolysis takes place in a few hours at a temperature of about 90°–100° C. In the preferred procedure, hydrochloric acid is employed as the acid medium. The product precipitates in the acidic reaction mixture as the hydrochloride salt and can be separated and purified by conventional procedures such as filtration, washing and recrystallization. The product can be further purified or it can be converted to the free base.

The physiologically-acceptable salts of the 2-[(2,6-substituted)phenoxymethyl]-2-imidazoline compounds can be prepared by dissolving 2-[(2,6-substituted)phenoxymethyl]-2-imidazoline in a minimal amount of alcohol and adding an alcohol solution of an acid such as hydrochloric acid, hydrobromic acid, malic acid, maleic acid or succinic acid until precipitation of the corresponding salt is complete. The salt can further be purified by recrystallization or converted to the free base form of 2-[(2,6-substituted)phenoxymethyl]-2-imidazoline.

The free base can be prepared by hydrolysis of the salt in aqueous base. The salt is mixed with an aqueous solution of sodium hydroxide (about 4 normal), after which the free base can be separated by extraction with a chlorinated hydrocarbon solvent. The solvent can be removed by conventional methods such as evaporation or distillation and the 2-[(2,6-substituted)phenoxymethyl]-2-imidazoline can be purified by methods such as recrystallization.

In preparing the compounds of the invention, a substituted phenoxyacetonitrile corresponding to Formula V or Formula VI, or an alkyl 2,6-dihalo-3-methylphenoxyacetimide hydrochloride, ethylenediamine monotosylate and an inert organic solvent, preferably 1,2-dichlorobenzene, are mixed together. The exact proportions of the reactants to be employed are not critical, some of the desired product being obtained when the reactants are combined in any proportions. However, the reaction consumes the reactants in equimolar proportions and the use of the reactants in such proportions is preferred. Nitrogen is directed through the mixture and the mixture is heated to a temperature within the reaction temperature range for about 1 to 10 hours. In a convenient procedure, the reaction vessel is vented to a trap containing aqueous hydrochloric acid to react with the ammonia of reaction. The reaction mixture is then cooled and filtered. The 2-[(2,6-substituted)phenoxymethyl]-2-imidazoline tosylate filter cake can be further purified by recrystallization or it can be converted to the free base by hydrolysis in aqueous base.

The following examples illustrate the invention but are not to be construed as limiting the same.

Example 1

2,6-dibromophenoxyacetonitrile (58.2 grams; 0.20 mole) was mixed with ethylenediamine monotosylate (47 grams; 0.20 mole) and 200 milliliters of 1,2-dichlorobenzene. Nitrogen gas was directed through the mixture while the mixture was heated at a temperature of 150° C. for one hour. The ammonia of reaction was collected by passing the exit gases through a gas scrubber containing dilute aqueous hydrochloric acid. The reaction mixture was cooled and filtered to obtain 2-[(2,6-dibromophenoxy)methyl]-2-imidazoline tosylate, having a molecular weight of 506.2, as a filter cake. The 2-[(2,6-dibromophenoxy)methyl]-2-imidazoline tosylate filter cake was mixed with a mixture of methylene chloride and water to form a slurry. The slurry was made basic by the addition of about 8 grams of sodium hydroxide in water. The organic layer was separated and evaporated in vacuo to leave 2-[(2,6-dibromophenoxy)methyl]-2-imidazoline, having a molecular weight of 334.0, as a residue. The 2-[(2,6-dibromophenoxy)methyl]-2-imidazoline was dissolved in about 100 milliliters of isopropyl alcohol. The alcohol solution was acidified by the addition of 5 normal hydrochloric acid in isopropyl alcohol until precipitation was complete. The mixture was filtered and the 2-[(2,6-dibromophenoxy)methyl]-2-imidazoline hydrochloride product was collected as a filter cake and found to melt at 230°–231° C.

In substantially the same procedure described above, employing similar inert organic solvents and substituting for the hydrochloric acid an acid capable of forming a physiologically-acceptable salt, the following 2-[(2,6-dibromophenoxy)methyl]-2-imidazoline salts are prepared.

2-[(2,6-dibromophenoxy)methyl]-2-imidazoline hydrobromide, having a molecular weight of 414.9, is prepared by substituting hydrobromic acid in lieu of the hydrochloric acid in the procedure described above.

2-[(2,6-dibromophenoxy)methyl] - 2 - imidazoline sulfate, having a molecular weight of 432.1, is prepared by substituting sulfuric acid in lieu of the hydrochloric acid in the procedure described above.

2-[(2,6-dibromophenoxy)methyl]-2 - imidazoline succinate, having a molecular weight of 452.1, is prepared by substituting succinic acid in lieu of the hydrochloric acid in the procedure described above.

2-[(2,6-dibromophenoxy)methyl] - 2 - imidazoline maleate, having a molecular weight of 450.1, is prepared by substituting maleic acid in lieu of the hydrochloric acid in the procedure described above.

2-[(2,6-dibromophenoxy)methyl]-2-imidazoline malate, having a molecular weight of 468.1, is prepared by substituting malic acid in lieu of the hydrochloric acid in the procedure described above.

Example 2

2,6-dichlorophenoxyacetonitrile (80.8 grams; 0.40 mole) was mixed with ethylenediamine monotosylate (94 grams; 0.40 mole) and 200 milliliters of 1,2-dichlorobenzene. Nitrogen gas was directed through the mixture while the mixture was heated at a temperature of 140°–145° C. for two hours. The ammonia of reaction was collected by passing the exit gases through a gas scrubber containing dilute aqueous hydrochloric acid. The reaction mixture was cooled and filtered to obtain 2-[(2,6-dichlorophenoxy)-methyl]-2-imidazoline tosylate, having a molecular weight of 417.3, as a filter cake. The 2-[(2,6-dichlorophenoxy)-methyl]-2-imidazoline tosylate filter cake was dissolved in water. The solution was made basic by the addition of about 16 grams of sodium hydroxide in aqueous solution. The mixture was extracted with methylene chloride and the organic layer was separated and evaporated in vacuo to leave 2-[(2,6-dichlorophenoxy)methyl]-2-imidazoline, having a molecular weight of 245.1, as a residue. The 2-[(2,6-dichlorophenoxy)methyl]-2-imidazoline was dissolved in 100 milliliters of isopropyl alcohol. The alcohol solution was acidified by the addition of 5 normal hydrochloric acid in isopropyl alcohol until precipitation was complete. The mixture was filtered and the 2-[(2,6-dichlorophenoxy)methyl] - 2 - imidazoline hydrochloride product was collected as a filter cake and found to melt at 221°–222° C. The structure of the product was confirmed by nuclear magnetic resonance spectroscopy.

In substantially the same procedure described above, employing similar inert organic solvents and substituting for the hydrochloric acid an acid capable of forming a physiologically-acceptable salt, the following 2-[(2,6-dichlorophenoxy)methyl]-2-imidazoline salts are prepared.

2-[(2,6-dichlorophenoxy)methyl]-2-imidazoline hydrobromide, having a molecular weight of 326, is prepared by substituting hydrobromic acid in lieu of the hydrocloric acid in the procedure described above.

2-[(2,6-dichlorophenoxy)methyl] - 2 - imidazoline sulfate, having a molecular weight of 343.2, is prepared by substituting sulfuric acid in lieu of the hydrochloric acid in the procedure described above.

2-[(2,6-dichlorophenoxy)methyl] - 2 - imidazoline succinate, having a molecular weight of 363.2, is prepared by substituting succinic acid in lieu of the hydrochloric acid in the procedure described above.

2-[(2,6-dichlorophenoxy)methyl]-2 - imidazoline maleate, having a molecular weight of 361.2, is prepared by substituting maleic acid in lieu of the hydrochloric acid in the procedure described above.

2-[(2,6-dichlorophenoxy)methyl]-2-imidazoline malate, having a molecular weight of 379.2, is prepared by substituting malic acid in lieu of the hydrochloric acid in the procedure described above.

Example 3

Ethyl 2,6-dichloro - 3 - methylphenoxyacetimide hydrochloride (17.8 grams; 0.06 mole) was mixed with ethylenediamine monotosylate (14.1 grams; 0.06 mole) and 100 milliliters of 1,2-dichlorobenzene. Nitrogen gas was directed through the mixture while the mixture was heated for about four hours at a temperature of about 82° C. The ammonia of reaction was collected by passing the exit gases through a gas scrubber containing dilute aqueous hydrochloric acid. The reaction mixture was evaporated in vacuo to obtain 2-[(2,6-dichloro-3-methylphenoxy)-methyl]-2-imidazoline tosylate, having a molecular weight of 431.3, as a residue. The 2-[(2,6-dichloro-3-methylphenoxy)-methyl]-2-imidazoline tosylate residue was dissolved in water acidified to pH 4 with hydrochloric acid. The solution was made basic by the addition of aqueous sodium hydroxide to a pH of about 13. The solution was extracted with methylene chloride and the extract was evaporated in vacuo to leave 2-[(2,6-dichloro-3-methylphenoxy)methyl]-2-imidazoline, having a molecular weight of 259.1, as a residue. The 2-[(2,6-dichloro-3-methylphenoxy)methyl] - 2 - imidazoline was dissolved in about 100 milliliters of dimethoxyethane. The solution was acidified by the addition of about 6 normal hydrochloric acid in isopropyl alcohol until precipitation was complete. The mixture was filtered and the 2-[(2,6-dichloro - 3 - methylphenoxy)methyl]-2-imidazoline hydrochloride product was collected as a filter cake and found to melt at 229°–230° C. The structure of the product was confirmed by nuclear magnetic resonance spectroscopy.

In substantially the same procedure, 2-[(2,6-dibromo-3-methylphenoxy)methyl]-2-imidazoline hydrochloride, having a molecular weight of 384.5, is prepared by mixing together equimolar proportions of ethyl 2,6-dibromo-3-methylphenoxyacetimide hydrochloride and ethylenediamine monotosylate, separating the tosylate salt, liberating the free base by treatment with sodium hydroxide and preparing the hydrochloride by treatment with hydrochloric acid.

Example 4

2-chloro-6-methylphenoxyacetonitrile (54.5 grams; 0.30 mole) was mixed with ethylenediamine monotosylate (70.5 grams; 0.30 mole) and 100 milliliters of 1,2-dichlorobenzene. Nitrogen gas was directed through the mixture while the mixture was heated at a temperature of 130°–145° C. for two hours. The ammonia of reaction was collected by passing the exit gases through a gas scrubber containing dilute aqueous hydrochloric acid. The reaction mixture was cooled and filtered to obtain 2 - [(2 - chloro - 6 - methylphenoxy)methyl] - 2 - imidazoline tosylate, having a molecular weight of 396.8, as a filter cake. The 2-[(2-chloro-6-methylphenoxy)methyl]-2-imidazoline tosylate filter cake was mixed with water and the mixture was made basic by the addition of about 12 grams of sodium hydroxide in water. The mixture was extracted with methylene chloride and the organic layer was separated and evaporated in vacuo to leave 2-[(2-chloro - 6 - methylphenoxy)methyl] - 2 - imidazoline, having a molecular weight of 224.6, as a residue. The 2-[(2-chloro - 6 - methylphenoxy)methyl] - 2 - imidazoline was dissolved in about 100 milliliters of isopropyl alcohol. The alcohol solution was acidified by the addition of 5 normal hydrochloric acid in isopropyl alcohol until precipitation was complete. The mixture was filtered and the 2 - [(2 - chloro - 6 - methylphenoxy)methyl] - 2 - imidazoline hydrochloride product was collected as a filter cake and found to melt at 218°–219° C. The product was found to have a chloride equivalent weight of 261 as compared with the chloride equivalent weight of 261 calculated for the named structure.

Example 5

2-bromo-6-chlorophenoxyacetonitrile (74 grams; 0.30 mole) was mixed with ethylenediamine monotosylate (70.5 grams; 0.30 mole) and 200 milliliters of 1,2-dichlorobenzene. Nitrogen gas was passed through the mixture while the mixture was heated at a temperature of about 180° C. for 60 minutes. The ammonia of reaction was collected by passing the exit gases through a gas scrubber containing dilute aqueous hydrochloric acid. The reaction mixture was cooled and filtered to obtain 2 - [(2 - bromo - 6 - chlorophenoxy)methyl] - 2 - imidazoline tosylate, having a molecular weight of 461.8, as a filter cake. The 2-[(2-bromo-6-chlorophenoxy)-methyl]-2-imidazoline tosylate filter cake was mixed with a mixture of methylene chloride and water to form a slurry. The slurry was made basic by the addition of about 12 grams of sodium hydroxide in water. The organic layer was separated and evaporated in vacuo to leave 2 - [(2 - bromo - 6 - chlorophenoxy)methyl] - 2 - imidazoline, having a molecular weight of 289.6, as a residue. The 2-[(2-bromo-6-chlorophenoxy)methyl]-2-imidazoline was dissolved in about 100 milliliters of isopropyl alcohol. The alcohol solution was acidified by the addition of 5 normal hydrochloric acid in isopropyl alcohol until precipitation was complete. The mixture was filtered and the 2-[(2-bromo-6-chlorophenoxy)methyl]-2-imidazoline hydrochloride product was collected as a filter cake and found to melt at 214°–215° C. The structure of the product was confirmed by nuclear magnetic resonance spectroscopy.

In substantially the same procedure and employing similar inert organic solvents, the following 2-[(2,6-substituted)phenoxymethyl] - 2 - imidazoline compounds are prepared.

2 - [(4 - acetamido - 2,6 - dichlorophenoxy)methyl]-2-imidazoline hydrochloride, having a molecular weight of 338.7, is prepared by mixing together equimolar proportions of 4-acetamido-2,6-dichlorophenoxyacetonitrile and ethylenediamine monotosylate, separating the tosylate salt, liberating the free base with sodium hydroxide and treating the free base with alcoholic hydrochloric acid to precipitate the hydrochloride salt.

2 - [(4 - acetamido - 2,6 - dibromophenoxy)methyl]-2-imidazoline hydrochloride, having a molecular weight of 427.5, melting at 235°–236° C., was prepared by mixing together equimolar proportions of 4-acetamido-2,6-dibromophenoxyacetonitrile and ethylenediamine monotosylate, separating the tosylate salt, liberating the free base by treatment with sodium hydroxide and preparing the hydrochloride by treatment with alcoholic hydrochloric acid.

Example 6

2-[(4 - acetamido-2,6 - dibromophenoxy)methyl] - 2-imidazoline hydrochloride (34.2 grams; 0.08 mole) was dissolved in 100 milliliters of aqueous 5 normal hydrochloric acid. The solution was heated on a steam bath for about 2.5 hours during which time a precipitate formed. The mixture was cooled and filtered and the filter cake was washed with aqueous 5 normal hydrochloric acid. The filter cake was dried and the 2-[(4-amino-2,6-dibromophenoxy)methyl] - 2 - imidazoline hydrochloride product was found to melt at 235°–236° C. The structure of the product was confirmed by nuclear magnetic resonance spectroscopy.

In substantially the same procedures, 2-[(4-amino-2,6-dichlorophenoxy)methyl] - 2 - imidazoline hydrochloride, having a molecular weight of 296.5, is prepared by the hydrolysis of 2-[(4 - acetamido - 2,6 - dichlorophenoxy)-methyl]-2-imidazoline hydrochloride in excess aqueous hydrochloric acid.

The novel compounds corresponding to Formula I wherein R corresponds to one of Formulae II, III and IV and wherein A is amino when R corresponds to Formula IV are useful as analgesics. Groups of mice were administered one of the test compounds at various dosage rates. The mice were subsequently challenged by the intraperitoneal injection of aqueous 0.1 percent hydrochloric acid at a dosage rate of 0.01 milliliter per gram. The mice were then placed in clear plastic cages and observed. In untreated mice, the intraperitoneal injection of this dosage of hydrochloric acid is followed by characteristic writhing of the mice, that is, flattening of the abdomen against the floor of the cage accompanied by rotation of the spine and pelvis. The dosage of each 2-[(2,6 - substituted)phenoxymethyl] - 2 - imidazoline hydrochloride which was effective to prevent writhing in 50 percent of the mice (ED 50) was calculated. The ED 50's for the compounds tested and the routes of administration are set out in the following table.

TABLE I

| Compound | ED 50 in milligrams per kilogram | Route of administration |
|---|---|---|
| 2-[(2,6-dibromophenoxy)-methyl]-2-imidazoline hydrochloride. | 0.54 | Subcutaneous injection. |
| 2-[(2,6-dichlorophenoxy)-methyl]-2-imidazoline hydrochloride. | 1.1 | Do. |
| 2-[(4-amino-2,6-dibromophenoxy)methyl]-2-imidazoline hydrochloride. | 3.0 | Do. |
| 2-[(2,6-dichloro-3-methyl-phenoxy)-methyl]-2-imidazoline hydrochloride. | 0.9 | Do. |
| 2-[(2-bromo-6-chlorophenoxy)-methyl]-2-imidazoline hydrochloride. | 2.0 | Oral. |

In similar operations, representative compounds of the invention were administered to mice at dosage levels of 1, 2.5 or 25 milligrams per kilogram. For purposes of comparison, other 2 - [(substituted) - phenoxymethyl]-2-imidazoline compounds were administered to separate groups of mice at a dosage level of 10 milligrams per kilogram. The mice were then challenged with hydrochloric acid as described above. The dosage rate for each compound and the percentage of mice in each group protected from writhing are set out in Table II.

TABLE II

| Compound | Dosage, milligrams per kilogram | Percentage of mice protected |
|---|---|---|
| 2-[(2,6-dibromophenoxy)methyl]-2-imidazoline hydrochloride. | 1 | 100 |
| 2-[(2,6-dichlorophenoxy)methyl]-2-imidazoline hydrochloride. | 2.5 | 100 |
| 2-[(2-bromo-6-chlorophenoxy)methyl]-2-imidazoline hydrochloride. | 25 | 100 |
| 2-[(4-amino-2,6-dibromophenoxy)methyl]-2-imidazoline hydrochloride. | 25 | 100 |
| 2-[(2,6-dichloro-3-methylphenoxy)methyl]-2-imidazoline hydrochloride. | 25 | 100 |
| 2-[(2-chloro-6-methylphenoxy)methyl]-2-imidazoline hydrochloride. | 1 | 100 |
| 2-[(2,4-dichlorophenoxy)methyl]-2-imidazoline hydrochloride. | 10 | 0 |
| 2-[(2-bromophenoxy)methyl]-2-imidazoline hydrochloride. | 10 | 0 |
| 2-[(2-chlorophenoxy)methyl]-2-imidazoline hydrochloride. | 10 | 0 |

The ethyl 2,6-dihalo-3-methylphenoxyacetimide hydrochloride employed as a starting material herein can be prepared according to known procedures. In a representative operation, 0.07 mole of 2,6-dichloro-3-methylphenoxyacetonitrile, 4.4 milliliters of ethanol and 250 milliliters of diethyl ether were mixed together. The mixture was saturated with hydrochloric acid for about one hour at 0°–5° C. The mixture was concentrated by evaporation and filtered, and the ethyl 2,6-dichloro-3-methylphenoxyacetimide hydrochloride was collected as a filter cake. The substituted phenoxyacetonitriles employed as starting materials are likewise prepared by conventional methods. In a representative operation, 2,6-dibromophenol (101 grams; 0.40 mole) was mixed with 55 grams (0.40 mole) of anhydrous potassium carbonate and 200 milliliters of dimethylsulfoxide. The mixture was stirred at 70° C. while chloroacetonitrile (32 grams; 0.42 mole) was added dropwise over a 15 minute period. The mixture was held at a temperature of 75° C. for three hours after which it was cooled and filtered. The filtrate was distilled and the 2,6-dichlorophenoxyacetonitrile product was collected as a fraction boiling at 135°–138° C. under a pressure of 2–3 millimeters of mercury. The product was recrystallized from cyclohexane and the 2,6-dichlorophenoxyacetonitrile product was found to melt at 63°–63.5° C.

I claim:
1. A member of the group consisting of a 2-[(2,6-substituted)phenoxymethyl]-2-imidazoline compound and the physiologically-acceptable salt thereof, the compound corresponding to the formula

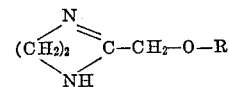

I wherein R represents a member of the group of radicals corresponding to one of the formulae

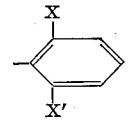

II

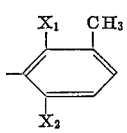

III

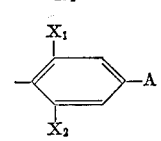

IV wherein X, $X_1$ and $X_2$ each independently represent a member of the group consisting of chlorine and bromine, X' represents a member of the group consisting of chlorine, bromine and methyl and A represents a member of the group consisting of acetamido and amino.

2. The compound of claim 1 wherein the compound is 2-[(2,6-dibromophenoxy)methyl]-2 - imidazoline hydrochloride.

3. The compound of claim 1 wherein the compound is 2-[(2,6-dibromophenoxy)methyl]-2-imidazoline.

4. The compound of claim 1 wherein the compound is 2-[(2,6-dichlorophenoxy)methyl]-2 - imidazoline hydrochloride.

5. The compound of claim 1 wherein the compound is 2-[(2,6-dichlorophenoxy)methyl]-2-imidazoline.

6. The compound of claim 1 wherein the compound is 2 - [(2,6 - dichloro-3-methylphenoxy)methyl]-2-imidazoline hydrochloride.

7. The compound of claim 1 wherein the compound is 2-[(2-chloro-6-methylphenoxy)methyl] - 2 - imidazoline hydrochloride.

8. The compound of claim 1 wherein the compound is 2-[(2-bromo-6-chlorophenoxy)methyl]-2-imidazoline hydrochloride.

9. The compound of claim 1 wherein the compound is 2-[(2-bromo-6-chlorophenoxy)methyl]-2-imidazoline.

References Cited

UNITED STATES PATENTS 2,919,274   12/1959   Faust et al. _____ 260—309.6

FOREIGN PATENTS 199,906   12/1938   Switzerland.
204,726   8/1939    Switzerland.
204,742   8/1939    Switzerland.

OTHER REFERENCES

Julia: Bul. Soc. Chim. France, vol. 23, pp. 1365–7 (1956).

Djerassi et al.: Jour. Amer. Chem. Soc., vol. 69, pp. 1688–92 (1947).

JOHN D. RUDOLPH, *Primary Examiner.*

NATALIE TROUSOF, *Assistant Examiner.*

U.S. Cl. X.R.

260—453, 465, 999